(12) United States Patent
Cho et al.

(10) Patent No.: US 7,275,382 B2
(45) Date of Patent: Oct. 2, 2007

(54) COGENERATION SYSTEM

(75) Inventors: Eun Jun Cho, Buchun-Si (KR); Yun Ho Ryu, Seoul (KR); Yeong Seop Choe, Buchun-si (KR); Jae Won Lee, Seoul (KR); Baik young Chung, Inchun-si (KR)

(73) Assignee: LG Electronics Inc., Seoul (KR)

( * ) Notice: Subject to any disclaimer, the term of this patent is extended or adjusted under 35 U.S.C. 154(b) by 225 days.

(21) Appl. No.: 11/155,750

(22) Filed: Jun. 20, 2005

(65) Prior Publication Data

US 2006/0123822 A1 Jun. 15, 2006

(30) Foreign Application Priority Data

Dec. 10, 2004 (KR) .................... 10-2004-0104365

(51) Int. Cl.
*F25B 27/02* (2006.01)

(52) U.S. Cl. .................................... 62/238.7

(58) Field of Classification Search .... 62/238.6–238.7, 62/324.1
See application file for complete search history.

(56) References Cited

U.S. PATENT DOCUMENTS 5,003,788 A * 4/1991 Fischer ...................... 62/238.7
5,429,179 A * 7/1995 Klausing .................... 165/240
6,662,864 B2 * 12/2003 Burk et al. .................. 165/202
6,735,969 B2 * 5/2004 Kasagi et al. ............... 62/238.7

FOREIGN PATENT DOCUMENTS

KR    1999-0034016 U    8/1999
KR    2003-0019226 A    3/2003

* cited by examiner

*Primary Examiner*—William E. Tapolcai
(74) *Attorney, Agent, or Firm*—Birch, Stewart, Kolasch & Birch, LLP (57) ABSTRACT

A cogeneration system including a generator, a drive source operating to drive the generator, and thus, to cause the generator to generate electricity, a heat pump type air conditioner including a compressor, a 4-way valve, an indoor heat exchanger, an expansion device, and an outdoor heat exchanger, a heater to heat air, which has passed around the indoor heat exchanger after completing heat exchange with the indoor heat exchanger, and a waste heat recoverer to recover waste heat of the drive source during a heating operation of the heat pump type air conditioner, and to supply the recovered waste heat to the heater. The waste heat of the drive source can be re-used to heat air passing through the indoor heat exchanger, so that the heating performance of the heat pump type air conditioner is enhanced.

20 Claims, 9 Drawing Sheets

COGENERATION SYSTEM

BACKGROUND OF THE INVENTION

1. Field of the Invention

The present invention relates to a cogeneration system including a heat pump type air conditioner, and, more particularly, to a cogeneration system in which waste heat of a drive source adapted to drive a generator is used to heat indoor air, and thus, to maximize the heating efficiency of a heat pump type air conditioner included in the cogeneration system.

2. Description of the Related Art

In general, cogeneration systems include an engine, a generator to generate electricity, using a rotating force outputted from the engine, a heat pump type air conditioner, which is operated with the electricity generated from the generator, and is switched between cooling and heating modes, a thermal storage tank to heat water for supply of hot water, and a heat supply line to supply heat of exhaust gas discharged from the engine and heat of cooling water used to cool the engine.

The generator has a rotor coupled to an output shaft of the engine.

The heat pump type air conditioner includes a compressor, a 4-way valve, an indoor heat exchanger, an expansion device, and an outdoor heat exchanger, which are connected in series by a refrigerant conduit.

Hereinafter, operation of a conventional cogeneration system, which has the above-mentioned configuration, will be described.

When the engine drives, the rotor of the generator is rotated by the output shaft of the engine, so that the generator generates electricity. The generated electricity is used to operate the heat pump type air conditioner or various electrical devices such as electric lamps.

Meanwhile, waste heat generated from the engine is supplied to the thermal storage tank via the heat supply line so that the supplied waste heat is used as a heat source to heat water for supply of hot water.

When the heat pump type air conditioner operates in a heating mode, the compressor is driven to compress a refrigerant. At this time, the 4-way valve establishes a flow path to allow the compressed refrigerant to be circulated through the indoor heat exchanger, expansion device, outdoor heat exchanger, and compressor, in this order. The indoor heat exchanger functions as a condenser to heat indoor air.

On the other hand, when the heat pump type air conditioner operates in a cooling mode, the compressor is driven to compress a refrigerant. At this time, the 4-way valve establishes a flow path to allow the compressed refrigerant to be circulated through the outdoor heat exchanger, expansion device, indoor heat exchanger, and compressor, in this order. The indoor heat exchanger functions as an evaporator to cool indoor air.

However, the above-mentioned conventional cogeneration system has a problem of low system efficiency because the waste heat of the engine is used only to heat water for supply of hot water.

SUMMARY OF THE INVENTION

The present invention has been made in view of the above-mentioned problems, and it is an object of the invention to provide a cogeneration system in which waste heat of a drive source included in the cogeneration system is used to heat indoor air during a heating operation of a heat pump type air conditioner included in the cogeneration system, and thus, to maximize the heating efficiency of the heat pump type air conditioner.

In accordance with the present invention, this object is accomplished by providing a cogeneration system comprising: a generator; a drive source operating to drive the generator, and thus, to cause the generator to generate electricity, the drive source generating waste heat during the operation of the drive source; a heat pump type air conditioner including a compressor, a 4-way valve, an indoor heat exchanger, an expansion device, and an outdoor heat exchanger; a heater to heat air, which has passed around the indoor heat exchanger after completing heat exchange with the indoor heat exchanger; and a waste heat recoverer to recover the waste heat of the drive source during a heating operation of the heat pump type air conditioner, and to supply the recovered waste heat to the heater.

The heater may be integral with the indoor heat exchanger.

The heater may be separated from the indoor heat exchanger.

The waste heat recoverer may comprise an exhaust gas heat exchanger to absorb heat from exhaust gas discharged from the drive source, a cooling water heat exchanger to absorb heat from cooling water used to cool the drive source, and a heat transfer unit to transfer heat from at least one of the exhaust gas heat exchanger and cooling water heat exchanger to the heater.

The heat transfer unit may further comprise a heat medium circulation conduit to guide a heat medium for circulation of the heat medium such that the heat medium passes through the exhaust gas heat exchanger while being heated by the exhaust gas heat exchanger, is fed to the heater to transfer heat to the heater, and is then returned to the exhaust gas heat exchanger, and a heat medium circulation pump to pump the heat medium for the circulation of the heat medium.

The heat transfer unit may further comprise a cooling heat exchanger to cool the heat medium heated by the exhaust gas heat exchanger during a cooling operation of the heat pump type air conditioner, and a cooling heat exchanger circulation conduit connected to the heat medium circulation conduit to guide the heat medium to be circulated through the exhaust gas heat exchanger and the cooling heat exchanger.

The heat transfer unit may further comprise a valve unit to control the heat medium circulation conduit and the cooling heat exchanger circulation conduit such that the heat medium is circulated through the exhaust gas heat exchanger and the heater during the heating operation of the heat pump type air conditioner, and is circulated through the exhaust gas heat exchanger and the cooling heat exchanger during a cooling operation of the heat pump type air conditioner.

The cogeneration system may further comprise a suction-side overheating heat exchanger to heat a refrigerant sucked into the compressor during the heating operation of the heat pump type air conditioner, a second heat medium circulation conduit to guide a second heat medium for circulation of the second heat medium such that the second heat medium passes through the cooling water heat exchanger while being heated by the cooling water heat exchanger, is fed to the suction-side overheating heat exchanger to transfer heat to the suction-side overheating heat exchanger, and is then returned to the cooling water heat exchanger, and a second heat medium circulation pump to pump the second heat medium for the circulation of the second heat medium.

The cogeneration system may further comprise a second cooling heat exchanger to cool the second heat medium heated by the cooling water heat exchanger during a cooling operation of the heat pump type air conditioner, and a second cooling heat exchanger circulation conduit connected to the second heat medium circulation conduit to guide the second heat medium to be circulated through the cooling water heat exchanger and the second cooling heat exchanger.

The cogeneration system may further comprise a second valve unit to control the second heat medium circulation conduit and the second cooling heat exchanger circulation conduit such that the second heat medium is circulated through the cooling water heat exchanger and the suction-side overheating heat exchanger during the heating operation of the heat pump type air conditioner, and is circulated through the cooling water heat exchanger and the second cooling heat exchanger during the cooling operation of the heat pump type air conditioner.

The cogeneration system may further comprise a refrigerant controller which controls the refrigerant supplied toward the compressor to be sucked into the compressor after passing through the suction-side overheating heat exchanger during the heating operation of the heat pump type air conditioner, and to be sucked into the compressor without passing through the suction-side overheating heat exchanger during the cooling operation of the heat pump type air conditioner.

The refrigerant controller may comprise a bypass conduit to guide the refrigerant supplied toward the compressor to bypass the suction-side overheating heat exchanger, and a third valve unit to allow the refrigerant supplied toward the compressor to pass through a selected one of the suction-side overheating heat exchanger and the bypass conduit.

The drive source may bean engine or a fuel cell.

The heat pump type air conditioner may use the electricity generated from the generator.

At least one of the drive source, the generator, the heat pump type air conditioner, and the heater may comprise a plurality of ones.

The cogeneration system according to the present invention has an advantage in that waste heat of a drive source to drive a generator is re-used to heat air passing through an indoor heat exchanger, so that the heating performance of a heat pump type air conditioner including the indoor heat exchanger is enhanced.

Also, the cogeneration system according to the present invention has an advantage in that the waste heat of cooling water of the drive source is re-used, in addition to the waste heat of exhaust gas of the drive source, to re-heat air passing through the indoor heat exchanger, so that the heating performance of the heat pump type air conditioner is maximized.

In addition, the cogeneration system according to the present invention has an advantage in that the waste heat of exhaust gas of the drive source is re-used to re-heat air passing through the indoor heat exchanger, and the waste heat of cooling water of the drive source is re-used to heat refrigerant sucked into a compressor, so that maximal system efficiency is obtained.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

Hereinafter, exemplary embodiments of a cogeneration system according to the present invention will be described with reference to the annexed drawings. In the following description, identical elements are referred to by the same title and designated by the same reference numeral, without any redundant description thereof.

Figure 1:
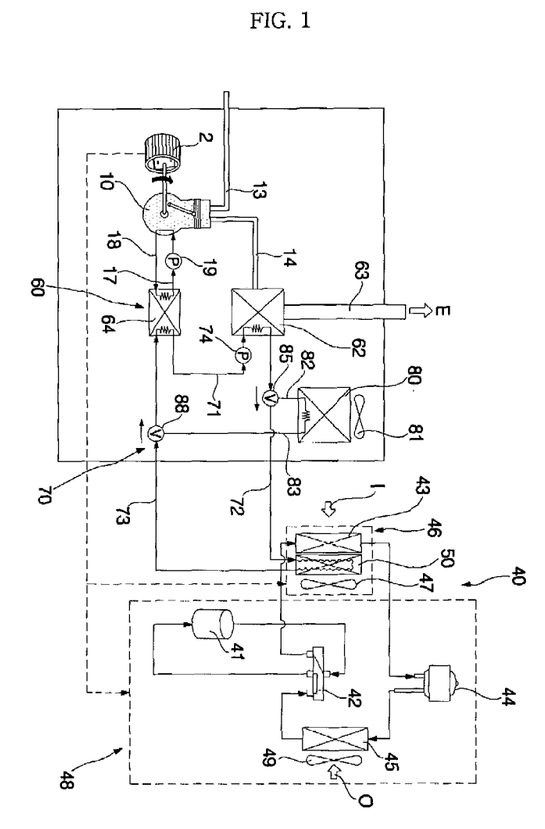
FIG. 1 is a schematic diagram of a cogeneration system according to a first embodiment of the present invention, illustrating a state in which the cogeneration system operates in a heating mode.
Figure 2:
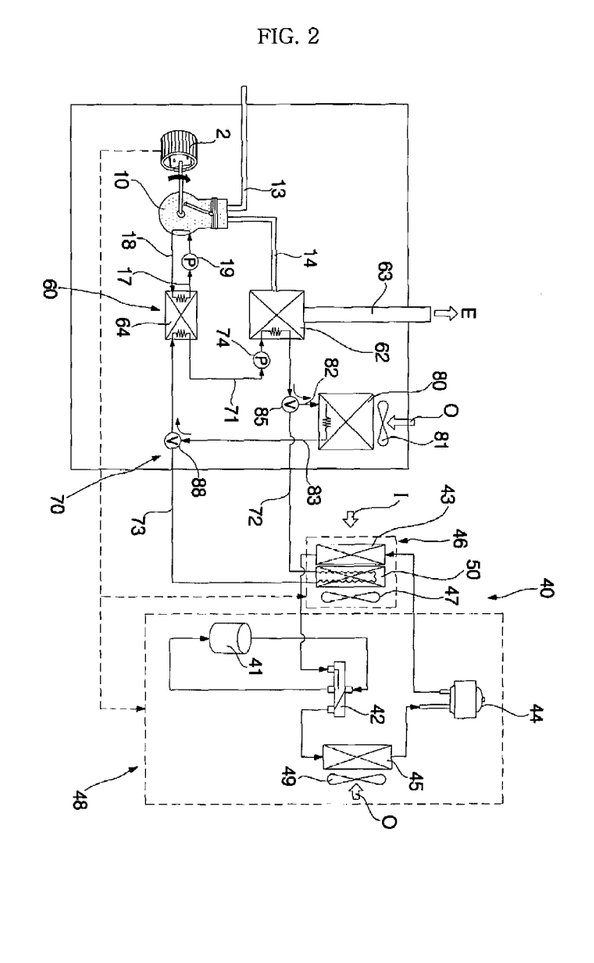
FIG. 2 is a schematic diagram of the cogeneration system according to the first embodiment of the present invention, illustrating a state in which the cogeneration system operates in a cooling mode.

FIG. 1 is a schematic diagram of a cogeneration system according to a first embodiment of the present invention, illustrating a state in which the cogeneration system operates in a heating mode. FIG. 2 is a schematic diagram of the cogeneration system according to the first embodiment of the present invention, illustrating a state in which the cogeneration system operates in a cooling mode.

As shown in FIGS. 1 and 2, the cogeneration system according to the first embodiment of the present invention includes a generator 2, and a drive source 10, which operates to drive the generator 2 for generation of electricity, and generates waste heat during operation thereof. The cogeneration system also includes a heat pump type air conditioner 40, which includes a compressor 41, a 4-way valve 42, an indoor heat exchanger 43, an expansion device 44, and an outdoor heat exchanger 45, a heater 50 adapted to heat air, which has passed around the indoor heat exchanger 43 after completing heat exchange with the indoor heat exchanger 43, a waste heat recoverer 60 adapted to recover the waste heat of the drive source 10, and to supply the recovered waste heat to the heater 50.

The generator 2 may be an AC generator or a DC generator. The generator 2 includes a rotor coupled to an output shaft of the drive source 10 so that the generator 2 generates electricity during rotation of the output shaft.

The drive source 10 comprises an engine, a fuel cell, or the like. The following description will be given only in conjunction with the case in which the drive source 10 comprises an engine.

The engine 10 includes a combustion chamber defined in the interior of the engine 10.

A fuel tube 13 and an exhaust tube 14 are connected to the engine 10. The fuel tube 13 is adapted to supply fuel such as liquefied gas or liquefied petroleum gas into the combustion chamber. The exhaust tube 14 is adapted to guide exhaust gas discharged from the combustion chamber.

The exhaust tube 14 is arranged between the engine 10 and an exhaust gas heat exchanger 62, in order to guide exhaust gas E discharged from the engine 10 to the exhaust gas heat exchanger 62. The exhaust gas heat exchanger 62 will be described in detail hereinafter.

The engine 10 is connected with a cooling water heat exchanger 64 via cooling water circulation conduits 17 and 18, so as to circulate cooling water between the engine and the cooling water heat exchanger 64. That is, cooling water, which is heated while cooling the engine 10, is fed to the cooling water heat exchanger 64 via the cooling water circulation conduit 18, and is then returned to the engine 10 via the cooling water circulation conduit 17 after transferring heat to the cooling water heat exchanger 64.

For the circulation of the cooling water, a cooling water circulation pump 19 is connected to one of the engine 10, cooling water heat exchanger 64, and cooling water circulation conduits 17 and 18.

The heat pump type air conditioner 40 is connected with the generator 2 via a power line, so as to use the electricity generated from the generator 2.

When the heat pump type air conditioner 40 operates in a heating mode, the refrigerant is compressed by the compressor 41, and is then circulated through the 4-way valve 42, indoor heat exchanger 43, expansion device 44, outdoor heat exchanger 45, 4-way valve 42, and compressor 41, in this order, as shown in FIG. 1. In this case, the outdoor heat exchanger 45 functions as an evaporator, whereas the indoor heat exchanger 43 functions as a condenser to discharge heat into indoor air.

On the other hand, when the heat pump type air conditioner 40 operates in a heating mode, the refrigerant is compressed by the compressor 41, and is then circulated through the 4-way valve 42, outdoor heat exchanger 45, expansion device 44, indoor heat exchanger 43, 4-way valve 42, and compressor 41, in this order, as shown in FIG. 2. In this case, the outdoor heat exchanger 45 functions as a condenser, whereas the indoor heat exchanger 43 functions as an evaporator to absorb heat from indoor air.

An indoor fan 47 is arranged near the indoor heat exchanger 43 to force indoor air I to pass around the indoor heat exchanger 43. The indoor heat exchanger 43 and indoor fan 47 constitute an indoor unit 46 of the heat pump type air conditioner 40.

An outdoor fan 49 is arranged near the outdoor heat exchanger 45 to force outdoor air 0 to pass around the outdoor heat exchanger 45. The outdoor fan 49 constitutes an outdoor unit 48 of the heat pump type air conditioner 40, together with the compressor 41, 4-way valve 42, and outdoor heat exchanger 45.

The indoor heat exchanger 43 and heater 50 may be separated from each other or may be integral with each other.

Where the indoor heat exchanger 43 and heater 50 are separated from each other, the indoor heat exchanger 43 has a configuration including a refrigerant tube, through which the refrigerant passes, and a plurality of fins to promote heat transfer of the refrigerant tube. In this case, the heater 50 has a configuration including a heat medium tube, through which a heat medium passes, and a plurality of fins to promote heat transfer of the heat medium tube.

The indoor heat exchanger 43 and heater 50 may be spaced apart from each other by a predetermined distance, or may be arranged to be in contact with each other.

On the other hand, where the indoor heat exchanger 43 and heater 50 are integral with each other, the integral structure thereof includes a heat medium tube, through which a heat medium passes, a refrigerant tube, through which the refrigerant passes, and a plurality of common fins arranged to be in contact with both the heat medium tube and the refrigerant tube to promote heat transfer of the heat medium tube and heat transfer of the refrigerant tube.

The heater 50 is installed in the interior of the indoor unit 46 such that the heater 50 is arranged downstream from the indoor heat exchanger 43 with respect to a flowing direction of indoor air I blown toward the indoor heat exchanger 43.

The waste heat recoverer 60 includes the exhaust gas heat exchanger 62 adapted to absorb heat from the exhaust gas discharged from the drive source 10, in particular, the engine, and the cooling water heat exchanger 64 adapted to absorb heat from the cooling water used to cool the drive source 10, in particular, the engine.

An exhaust tube 63 is connected to the exhaust gas heat exchanger 62 to guide the exhaust gas passing around the exhaust gas heat exchanger 62.

The waste heat recoverer 60 further includes a heat transfer unit 70 adapted to transfer heat from at least one of the exhaust gas heat exchanger 62 and cooling water heat exchanger 64 to the heater 50.

The heat transfer unit 70 may be configured to transfer heat only from the exhaust gas heat exchanger 62 to the heater 50, to transfer heat only from the cooling water heat exchanger 64 to the heater 50, or to transfer heat from both the exhaust gas heat exchanger 62 and the cooling water heat exchanger 64 to the heater 50. The following description will be given only in conjunction with the case in which the heat transfer unit 70 transfers heat from both the exhaust gas heat exchanger 62 and the cooling water heat exchanger 64 to the heater 50.

The heat transfer unit 70 includes heat medium circulation conduits 71, 72, and 73 to guide the heat medium for circulation of the heat medium such that the heat medium sequentially passes through the cooling water heat exchanger 64 and exhaust gas heat exchanger 62 while being heated by the cooling water heat exchanger 64 and exhaust gas heat exchanger 62, is fed to the heater 50 to heat the heater 50, and is then returned to the cooling water heat exchanger 64. The heat transfer unit 70 also includes a heat medium circulation pump 74 to pump the heat medium for the circulation of the heat medium.

The heat transfer unit 70 further includes a cooling heat exchanger 80 adapted to cool the heat medium heated by the cooling water heat exchanger 64 and exhaust gas heat exchanger 62 during the cooling operation of the heat pump type air conditioner 40.

The cooling heat exchanger 80 is installed in the interior of the thermal storage tank such that the cooling heat exchanger 80 transfers heat absorbed from the cooling water heat exchanger 64 and exhaust gas heat exchanger 62 to the thermal storage tank, or discharges the absorbed heat to the atmosphere. The following description will be given only in conjunction with the case in which the cooling heat exchanger 80 is used as a radiating heat exchanger.

The heat transfer unit 70 further includes a radiating fan 81 to blow outdoor air to the cooling heat exchanger 80.

The heat transfer unit 70 further includes cooling heat exchanger circulation conduits 82 and 83 respectively connected to the heat medium circulation conduits 72 and 73 to guide the heat medium to be circulated through the cooling water heat exchanger 64, exhaust gas heat exchanger 62, and cooling heat exchanger 80.

The cooling heat exchanger circulation conduit 82 has one end connected to the heat medium circulation conduit 72 between the exhaust gas heat exchanger 62 and the heater 50. The cooling heat exchanger circulation conduit 83 has one end connected to the other end of the cooling heat exchanger circulation conduit 82, and the other end connected to the heat medium circulation conduit 73 between the heater 50 and the cooling water heat exchanger 64.

The heat transfer unit 70 further includes a valve unit adapted to control opening/closing of the heat medium circulation conduits 72 and 73 and cooling heat exchanger circulation conduits 82 and 83 such that the heat medium is circulated through the cooling water heat exchanger 64, exhaust gas heat exchanger 62, and heater 50 during the heating operation of the heat pump type air conditioner 40, and is circulated through the cooling water heat exchanger 64, exhaust gas heat exchanger 62, and cooling heat exchanger 80 during the cooling operation of the heat pump type air conditioner 40.

The valve unit includes a first valve 85 arranged at a portion of one of the heat medium circulation conduits 71, 72, and 73, to which one end of the cooling heat exchanger circulation conduit 82 is connected, so as to allow the heat medium heated by the exhaust gas heat exchanger 62 to be supplied to the cooling heat exchanger 80 or to the heater 50, and a second valve 88 arranged at a portion of another one of the heat medium circulation conduits 71, 72, and 73, to which the other end of the cooling heat exchanger circulation conduit 83 is connected, so as to allow the heat medium emerging from the heater 50 to be supplied to the cooling water heat exchanger 64 without being supplied to the cooling heat exchanger 80, or to allow the heat medium emerging from the cooling heat exchanger 80 to be supplied to the cooling water heat exchanger 64 without being supplied to the heater 50.

The cogeneration system according to the first embodiment of the present invention further includes a controller to control the heat pump type air conditioner 40. During the heating operation of the heat pump type air conditioner 40, the controller controls the heat medium circulation pump 74 to operate, and controls the first valve 85 and second valve 88 to operate in a heating mode. Also, during the cooling operation of the heat pump type air conditioner 40, the controller controls the heat medium circulation pump 74 to operate, and controls the first valve 85 and second valve 88 to operate in a cooling mode.

Hereinafter, operation of the cogeneration system according to the first embodiment of the present invention will be described.

When fuel is supplied to the engine 10 via the fuel tube 13, the engine 10 is driven, so that the output shaft of the engine 10 is rotated, thereby causing the generator 2 to generate electricity.

Exhaust gas, which is discharged from the engine 10 during the operation of the engine 10, releases heat to the exhaust gas heat exchanger 62 while passing through the exhaust gas heat exchanger 62, and is then discharged to the atmosphere.

During the operation of the engine 10, the cooling water pump 19 is driven, so that the cooling water, which is heated while cooling the engine 10, is fed to the cooling water heat exchanger 64 via the cooling water circulation conduit 18, as shown in FIGS. 1 and 2. After releasing heat to the cooling water heat exchanger 64, the cooling water is returned to the engine 10 via the cooling water circulation conduit 17.

Meanwhile, when the heat pump type air conditioner 40 operates in the heating mode, the compressor 41 is driven with the electricity generated from the generator 2. In this case, the 4-way valve 42 is switched to a heating mode, and the indoor fan 47 and outdoor fan 49 are driven, as shown in FIG. 1. Also, the first valve 85 and second valve 88 are controlled to operate in a heating mode, and the heat medium circulation pump 74 is driven.

When the 4-way valve 42 is switched to the heating mode under the condition in which the compressor 41 operates, the refrigerant, which is compressed in the compressor 41, passes through the 4-way valve 42, indoor heat exchanger 43, expansion device 44, outdoor heat exchanger 45, and 4-way valve 42, in this order, and is then returned to the compressor 41. In this case, the indoor heat exchanger 43 functions as a condenser to heat indoor air.

The first valve 85 and second valve 88 close the cooling heat exchanger circulation conduits 82 and 83, respectively, while opening the heat medium circulation conduits 72 and 73, respectively. The heat medium circulation pump 74 pumps the heat medium.

The heat medium pumped by the heat medium circulation pump 74 is heated while passing through the cooling water heat exchanger 64, and is then introduced into the exhaust gas heat exchanger 62 via the heat medium circulation conduit 71. The heat medium is again heated by the exhaust gas heat exchanger 62, and is then introduced into the heater 50 through the heat medium circulation conduit 72.

The heat medium introduced into the heater 50 through the heat medium circulation conduit 72 again heats the indoor air heated by the indoor heat exchanger 53 while passing through the heater 50, thereby achieving an enhancement in heating performance. The heat medium is returned to the cooling water heat exchanger 64 through the heat medium circulation conduit 73.

On the other hand, when the heat pump type air conditioner 40 operates in the cooling mode, the compressor 41 is driven with the electricity generated from the generator 2. In this case, the 4-way valve 42 is switched to a cooling mode, and the indoor fan 47 and outdoor fan 49 are driven, as shown in FIG. 2. Also, the first valve 85 and second valve 88 are controlled to operate in a cooling mode, and the heat medium circulation pump 74 is driven. The radiating fan 81 is also rotated.

When the 4-way valve 42 is switched to the cooling mode under the condition in which the compressor 41 operates, the refrigerant, which is compressed in the compressor 41, passes through the 4-way valve 42, outdoor heat exchanger 45, expansion device 44, indoor heat exchanger 43, and 4-way valve 42, in this order, and is then returned to the compressor 41. In this case, the indoor heat exchanger 43 functions as an evaporator to cool indoor air.

The first valve 85 and second valve 88 open the cooling heat exchanger circulation conduits 82 and 83, respectively, while closing the heat medium circulation conduits 72 and 73, respectively. The heat medium circulation pump 74 pumps the heat medium.

The heat medium pumped by the heat medium circulation pump 74 is heated while passing through the cooling water heat exchanger 64, and is then introduced into the exhaust gas heat exchanger 62 via the heat medium circulation conduit 71. The heat medium is again heated by the exhaust gas heat exchanger 62, and is then introduced into the cooling heat exchanger 82 through the cooling heat exchanger circulation conduit 82.

The heat medium introduced into the cooling heat exchanger 82 through the cooling heat exchanger circulation conduit 82 discharges heat in accordance with the rotation of the radiating fan 81 while passing through the cooling heat exchanger 82. The heat medium is returned to the cooling water heat exchanger 64 through the cooling heat exchanger circulation conduit 83.

Figure 3:
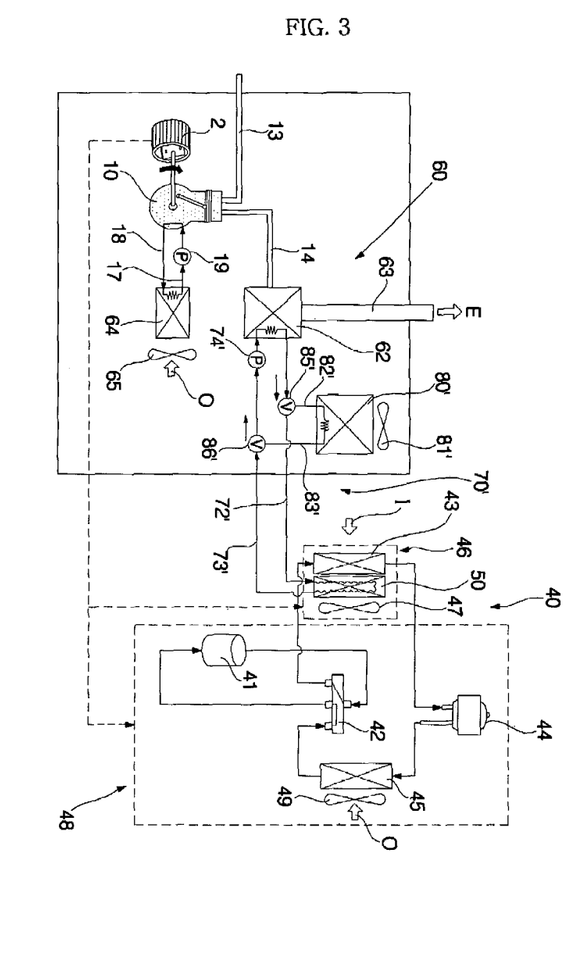
FIG. 3 is a schematic diagram of a cogeneration system according to a second embodiment of the present invention, illustrating a state in which the cogeneration system operates in a heating mode.
Figure 4:
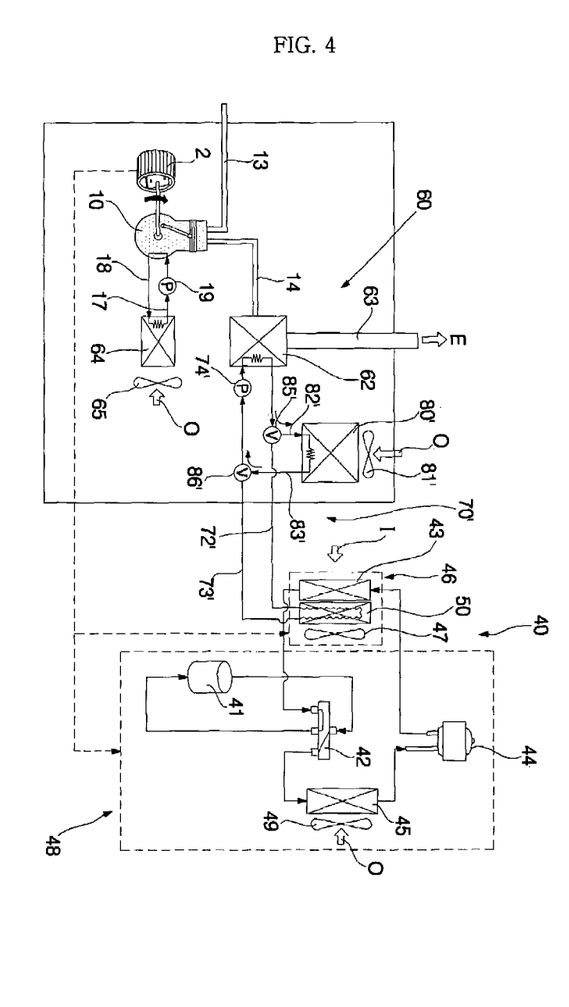
FIG. 4 is a schematic diagram of the cogeneration system according to the second embodiment of the present invention, illustrating a state in which the cogeneration system operates in a cooling mode.

FIG. 3 is a schematic diagram of a cogeneration system according to a second embodiment of the present invention, illustrating a state in which the cogeneration system operates in a heating mode. FIG. 4 is a schematic diagram of the cogeneration system according to the second embodiment of the present invention, illustrating a state in which the cogeneration system operates in a cooling mode.

In the cogeneration system according to this embodiment, as shown in FIGS. 3 and 4, during the heating operation of the heat pump type air conditioner 40, heat from one of the exhaust gas heat exchanger 62 and cooling water heat exchanger 64 is recovered to be supplied to the heater 50, and heat from the other one of the exhaust gas heat exchanger 62 and cooling water heat exchanger 64 is discharged to the atmosphere. The following description will be given only in conjunction with the case in which the heat of the exhaust gas heat exchanger 62 is recovered by a heat transfer unit 70', and is supplied to the heater 50, whereas the heat of the cooling water heat exchanger 64 is discharged to the atmosphere.

The heat transfer unit 70' includes a radiating fan 65 to discharge heat of the cooling water used to cool the drive source 10, that is, the heat of the cooling water heat exchanger 64, to the atmosphere.

The heat transfer unit 70' also includes heat medium circulation conduits 72' and 73' to guide the heat medium heated by the exhaust gas heat exchanger 62 for circulation of the heat medium such that the heat medium is returned to the exhaust gas heat exchanger 62 after transferring heat to the heater 50, and a heat medium circulation pump 74' to pump the heat medium for the circulation of the heat medium.

The heat transfer unit 70' further includes a cooling heat exchanger 80' adapted to cool the heat medium heated by the exhaust gas heat exchanger 62 during the cooling operation of the heat pump type air conditioner 40.

The heat transfer unit 70' further includes a radiating fan 81' to blow outdoor air to the cooling heat exchanger 80'.

The heat transfer unit 70' further includes cooling heat exchanger circulation conduits 82' and 83' respectively connected to the heat medium circulation conduits 72' and 73' to guide the heat medium to be circulated through the exhaust gas heat exchanger 62 and cooling heat exchanger 80'.

The cooling heat exchanger circulation conduit 82' has one end connected to the heat medium circulation conduit 72. The cooling heat exchanger circulation conduit 83' has one end connected to the other end of the cooling heat exchanger circulation conduit 82', and the other end connected to the heat medium circulation conduit 73.

The heat transfer unit 70' further includes a valve unit adapted to control opening/closing of the heat medium circulation conduits 72' and 73' and cooling heat exchanger circulation conduits 82' and 83' such that the heat medium is circulated through the exhaust gas heat exchanger 62 and heater 50 during the heating operation of the heat pump type air conditioner 40, and is circulated through the exhaust gas heat exchanger 62 and cooling heat exchanger 80' during the cooling operation of the heat pump type air conditioner 40.

The valve unit includes a first valve 85' arranged at a portion of one of the heat medium circulation conduits 72' and 73', to which one end of the cooling heat exchanger circulation conduit 82' is connected, so as to allow the heat medium heated by the exhaust gas heat exchanger 62' to be supplied to the cooling heat exchanger 80' or to the heater 50, and a second valve 86' arranged at a portion of the other one of the heat medium circulation conduits 72' and 73', to which the other end of the cooling heat exchanger circulation conduit 83' is connected, so as to allow the heat medium emerging from the heater 50 to be supplied to the exhaust gas heat exchanger 62 without being supplied to the cooling heat exchanger 80', or to allow the heat medium emerging from the cooling heat exchanger 80' to be supplied to the exhaust gas heat exchanger 62 without being supplied to the heater 50.

The cogeneration system of the second embodiment has the same configuration and functions, except for the radiator 90, as those of the first embodiment, in terms of the generator 2, drive source 10, heat pump type air conditioner 40, heater 50, exhaust gas heat exchanger 62, and cooling water heat exchanger 64. Accordingly, the constituent elements of the second embodiment respectively corresponding to those of the first embodiment are designated by the same reference numerals, and no detailed description thereof will be given.

When the heat pump type air conditioner 40 operates in the heating mode, the first valve 85' and second valve 86' are controlled to operate in a heating mode, and the heat medium circulation pump 74 is driven, as shown in FIG. 3. The radiating fan 65 of the heat transfer unit 70' is rotated.

The first valve 85' and second valve 86' close the cooling heat exchanger circulation conduits 82' and 83', respectively, while opening the heat medium circulation conduits 72' and 73', respectively. The heat medium circulation pump 74' pumps the heat medium.

The heat medium pumped by the heat medium circulation pump 74' is heated while passing through the exhaust gas heat exchanger 62, and is then introduced into the heater 50 via the heat medium circulation conduit 72'. Similarly to the first embodiment, the heat medium introduced into the heater 50 through the heat medium circulation conduit 72' again heats the indoor air heated by the indoor heat exchanger 53 while passing through the heater 50, thereby achieving an enhancement in heating performance. The heat medium is returned to the exhaust gas heat exchanger 62 through the heat medium circulation conduit 73'.

Meanwhile, heat transferred to the cooling water heat exchanger 64 is discharged to the atmosphere during the rotation of the radiating fan 65.

On the other hand, when the heat pump type air conditioner 40 operates in the cooling mode, the first valve 85' and second valve 86' are controlled to operate in a cooling mode, and the heat medium circulation pump 74 is driven, as shown in FIG. 4. The radiating fans 65 and 81' of the heat transfer unit 70' are also rotated.

The first valve 85' and second valve 86' open the cooling heat exchanger circulation conduits 82' and 83', respectively, while closing the heat medium circulation conduits 72' and 73', respectively. The heat medium circulation pump 74' pumps the heat medium.

The heat medium pumped by the heat medium circulation pump 74' is heated while passing through the exhaust gas heat exchanger 62, and is then introduced into the cooling heat exchanger 80' via the cooling heat exchanger circulation conduit 82'. The heat medium releases heat while passing through the cooling heat exchanger 80' in accordance with the rotation of the radiating fan 81'. Thereafter, the heat medium is returned to the exhaust gas heat exchanger 62 through the cooling heat exchanger circulation conduit 83'.

Meanwhile, heat transferred to the cooling water heat exchanger 64 is discharged to the atmosphere during the rotation of the radiating fan 65.

Figure 5:
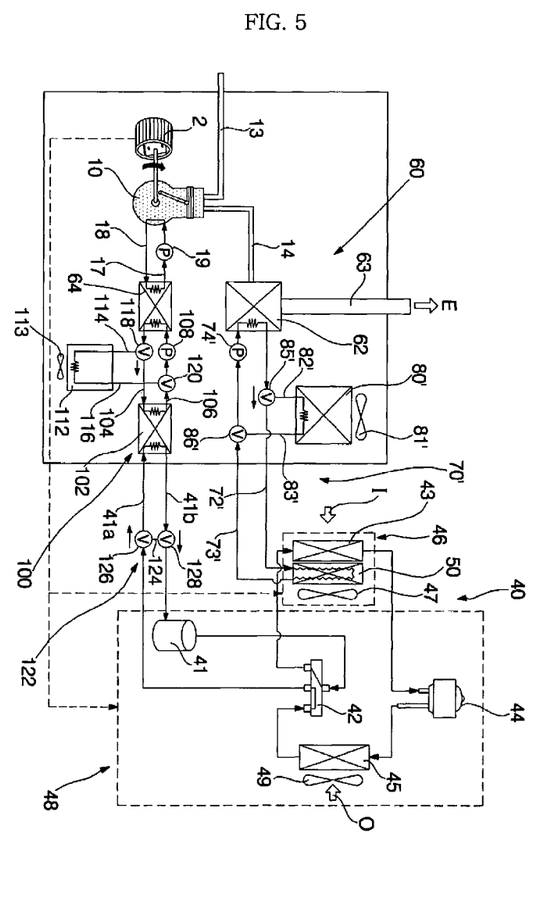
FIG. 5 is a schematic diagram of a cogeneration system according to a third embodiment of the present invention, illustrating a state in which the cogeneration system operates in a heating mode.
Figure 6:
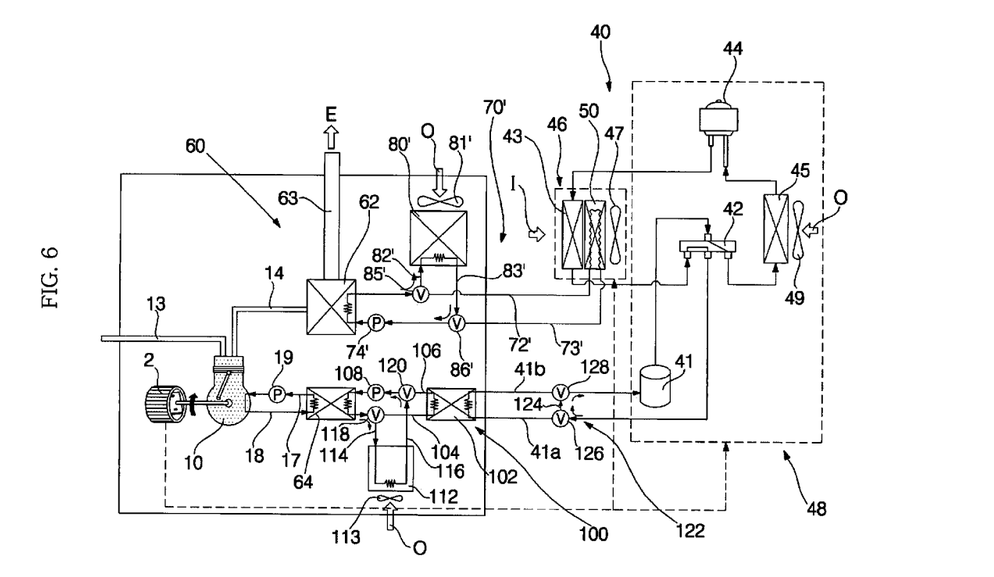
FIG. 6 is a schematic diagram of the cogeneration system according to the third embodiment of the present invention, illustrating a state in which the cogeneration system operates in a cooling mode.

FIG. 5 is a schematic diagram of a cogeneration system according to a third embodiment of the present invention, illustrating a state in which the cogeneration system operates in a heating mode. FIG. 6 is a schematic diagram of the cogeneration system according to the third embodiment of the present invention, illustrating a state in which the cogeneration system operates in a cooling mode.

In the cogeneration system according to this embodiment, as shown in FIGS. 5 and 6, during the heating operation of the heat pump type air conditioner 40, heat from one of the exhaust gas heat exchanger 62 and cooling water heat exchanger 64 is recovered to be supplied to the heater 50, and heat from the other one of the exhaust gas heat exchanger 62 and cooling water heat exchanger 64 is recovered to be supplied to the refrigerant sucked into the compressor 41. The following description will be given only in conjunction with the case in which the heat of the exhaust gas heat exchanger 62 is recovered by a first heat transfer unit, that is, the heat transfer unit 70', and is supplied to the heater 50, whereas the heat of the cooling water heat exchanger 64 is recovered by a second heat transfer unit 100, and is supplied to the refrigerant sucked into the compressor 41.

The cogeneration system of the third embodiment has the same configuration and functions as those of the first embodiment, in terms of the generator 2, drive source 10, heat pump type air conditioner 40, heater 50, exhaust gas heat exchanger 62, and cooling water heat exchanger 64. Accordingly, the constituent elements of the second embodiment respectively corresponding to those of the first embodiment are designated by the same reference numerals, and no detailed description thereof will be given. Also, the cogeneration system of the third embodiment has the same configuration and functions as those of the second embodiment, in terms of the heat transfer unit 70'. Accordingly, the constituent elements of the second embodiment respectively corresponding to those of the second embodiment are designated by the same reference numerals, and no detailed description thereof will be given.

The second heat transfer unit 100 includes a suction-side overheating heat exchanger 102 to heat the refrigerant sucked into the compressor 41 during the heating operation of the heat pump type air conditioner 40, second heat medium circulation conduits 104 and 106 to guide a second heat medium heated by the cooling water heat exchanger 64 for circulation of the second heat medium such that the second heat medium is returned to the cooling water heat exchanger 64 after transferring heat to the suction-side overheating heat exchanger 102, and a second heat medium circulation pump 108 to pump the second heat medium for the circulation of the second heat medium.

The second heat transfer unit 100 further includes a second cooling heat exchanger 112 adapted to cool the second heat medium heated by the cooling water heat exchanger 64 during the cooling operation of the heat pump type air conditioner 40.

The second cooling heat exchanger 112 is installed in the interior of the thermal storage tank such that the second cooling heat exchanger 112 transfers heat absorbed from the cooling water heat exchanger 64 to the thermal storage tank, or discharges the absorbed heat to the atmosphere. The following description will be given only in conjunction with the case in which the second cooling heat exchanger 112 is used as a radiating heat exchanger.

The second heat transfer unit 100 further includes a radiating fan 113 to blow outdoor air to the second cooling heat exchanger 112.

The second heat transfer unit 100 further includes second cooling heat exchanger circulation conduits 114 and 116 respectively connected to the second heat medium circulation conduits 104 and 106 to guide the second heat medium to be circulated through the cooling water heat exchanger 64 and second cooling heat exchanger 112.

The second cooling heat exchanger circulation conduit 114 has one end connected to the second heat medium circulation conduit 104. The second cooling heat exchanger circulation conduit 116 has one end connected to the other end of the second cooling heat exchanger circulation conduit 114, and the other end connected to the second heat medium circulation conduit 106.

The second heat transfer unit 100 further includes a second valve unit adapted to control opening/closing of the second heat medium circulation conduits 104 and 106 and second cooling heat exchanger circulation conduits 114 and 116 such that the second heat medium is circulated through the cooling water heat exchanger 64 and suction-side overheating heat exchanger 102 during the heating operation of the heat pump type air conditioner 40, and is circulated through the cooling water heat exchanger 64 and second cooling heat exchanger 112 during the cooling operation of the heat pump type air conditioner 40.

The second valve unit includes a third valve 118 arranged at a portion of one of the second heat medium circulation conduits 104 and 106, to which one end of the second cooling heat exchanger circulation conduit 114 is connected, so as to allow the second heat medium heated by the cooling water heat exchanger 64 to be supplied to the second cooling heat exchanger 112 or to the suction-side overheating heat exchanger 102, and a fourth valve 120 arranged at a portion of the other one of the second heat medium circulation conduits 104 and 106, to which the other end of the second cooling heat exchanger circulation conduit 116 is connected, so as to allow the second heat medium emerging from the suction-side overheating heat exchanger 102 to be supplied to the cooling water heat exchanger 64 without being supplied to the second cooling heat exchanger 112, or to allow the second heat medium emerging from the second cooling heat exchanger 112 to be supplied to the cooling water heat exchanger 64 without being supplied to the suction-side overheating heat exchanger 102.

The second heat transfer unit 100 further includes a refrigerant controller 122, which controls the refrigerant supplied toward the compressor 41 to be sucked into the compressor 41 after passing through the suction-side overheating heat exchanger 102 during the heating operation of the heat pump type air conditioner 40, and to be sucked into the compressor 41 without passing through the suction-side overheating heat exchanger 102 during the cooling operation of the heat pump type air conditioner 40.

The refrigerant controller 122 includes a bypass conduit 124 to guide the refrigerant supplied toward the compressor 41 to bypass the suction-side overheating heat exchanger 102, and a third valve unit to allow the refrigerant supplied toward the compressor 41 to pass through a selected one of the suction-side overheating heat exchanger 102 and bypass conduit 124.

The bypass conduit 124 has one end connected to a refrigerant conduit 41a extending between the 4-way valve 42 and the suction-side overheating heat exchanger 102, and the other end connected to a refrigerant conduit 41b extending between the suction-side overheating heat exchanger 102 and the compressor 41.

The third valve unit includes a fifth valve 126 arranged at one end of the bypass conduit 124, and a sixth valve 128 arranged at the other end of the bypass conduit 124.

When the heat pump type air conditioner 40 operates in the heating mode, the third valve 118 and fourth valve 120 are controlled to operate in a heating mode, and the second heat medium circulation pump 108 is driven, as shown in FIG. 5. The fifth valve 126 and sixth valve 128 are also controlled to operate in a heating mode.

The third valve 118 and fourth valve 120 close the second cooling heat exchanger circulation conduits 114 and 116, respectively, while opening the second heat medium circulation conduits 104 and 106, respectively. The second heat medium circulation pump 104 pumps the second heat medium.

The second heat medium pumped by the second heat medium circulation pump 108 is heated while passing through the cooling water heat exchanger 64, and is then introduced into the suction-side overheating heat exchanger 102 via the second heat medium circulation conduit 104. The second heat medium heats the suction-side overheating heat exchanger 102 while passing through the suction-side overheating heat exchanger 102. Thereafter, the second heat medium is returned to the exhaust gas heat exchanger 62 via the second heat medium circulation conduit 106.

The fifth valve 126 and sixth valve 128 close the bypass conduit 124 while opening the refrigerant conduit 41a connected between the 4-way valve 42 and the suction-side overheating heat exchanger 102, and the refrigerant conduit 41b connected between the suction-side overheating heat exchanger 102 and the compressor 41, respectively.

In this case, the refrigerant emerging from the 4-way valve 42 is heated while passing through the suction-side overheating heat exchanger 102, and is then compressed by the compressor 41. The compressed refrigerant then passes through the indoor heat exchanger 43 via the 4-way valve 42. Since the refrigerant is heated by the suction-side overheating heat exchanger 102, heat of an increased temperature is transferred from the refrigerant to the indoor heat exchanger 43. Accordingly, the heating performance of the heat pump type air conditioner 40 is enhanced.

On the other hand, when the heat pump type air conditioner 40 operates in the cooling mode, the third valve 118 and fourth valve 120 are controlled to operate in a cooling mode, and the second heat medium circulation pump 108 is driven, as shown in FIG. 6. The fifth valve 126 and sixth valve 128 are also controlled to operate in a cooling mode. Also, the radiating fan 113 of the second heat transfer unit 100 is rotated.

The third valve 118 and fourth valve 120 open the second cooling heat exchanger circulation conduits 114 and 116, respectively, while closing the second heat medium circulation conduits 104 and 106, respectively. The second heat medium circulation pump 104 pumps the second heat medium.

The second heat medium pumped by the second heat medium circulation pump 108 is heated while passing through the cooling water heat exchanger 64, and is then introduced into the second cooling heat exchanger 112 via the second cooling heat exchanger circulation conduit 114. The second heat medium releases heat while passing through the second cooling heat exchanger 112, in accordance with the rotation of the radiating fan 113. Thereafter, the second heat medium is returned to the cooling water heat exchanger 64 via the second cooling heat exchanger circulation conduit 116.

Meanwhile, the fifth valve 126 and sixth valve 128 open the bypass conduit 124 while closing the refrigerant conduit 41a connected between the 4-way valve 42 and the suction-side overheating heat exchanger 102, and the refrigerant conduit 41b connected between the suction-side overheating heat exchanger 102 and the compressor 41, respectively.

In this case, the refrigerant emerging from the 4-way valve 42 is sucked into the compressor 41 after passing through the bypass conduit 124, so that the refrigerant is compressed by the compressor 41.

Figure 7:
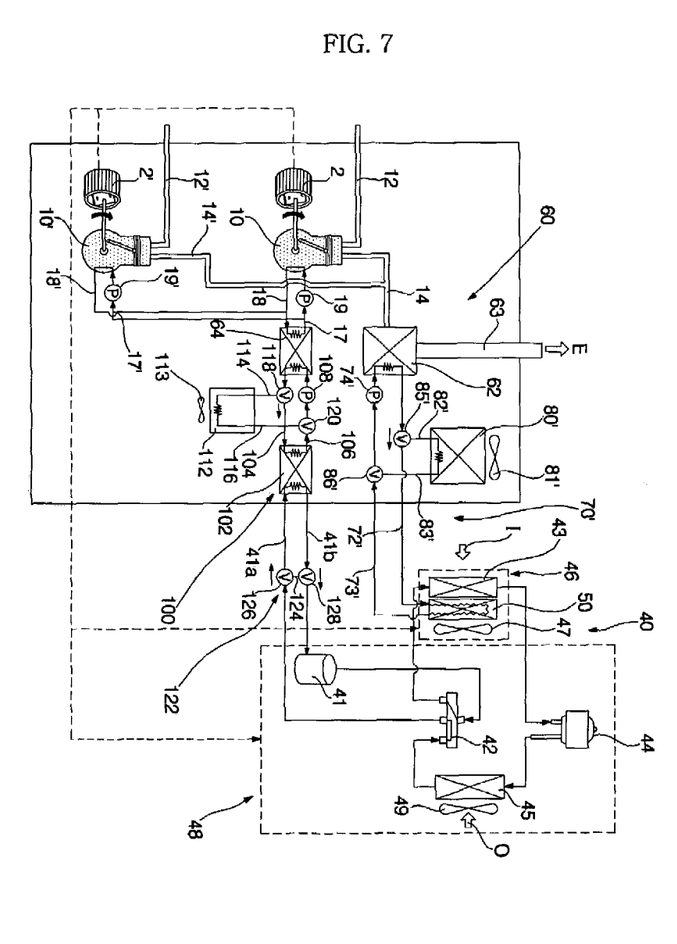
FIG. 7 is a schematic diagram of a cogeneration system according to a fourth embodiment of the present invention, illustrating a state in which the cogeneration system operates in a heating mode.

FIG. 7 is a schematic diagram of a cogeneration system according to a fourth embodiment of the present invention, illustrating a state in which the cogeneration system operates in a heating mode.

As shown in FIG. 7, the cogeneration system according to this embodiment includes a plurality of drive sources 10, 10' . . . , and a plurality of generators 2, 2' . . . coupled to respective rotating shafts of the drive sources 10, 10' . . . .

Only one or at least two of the drive sources 10, 10' . . . operate in accordance with the cooling or heating load of the heat pump type air conditioner 40.

Fuel tubes 13, 13' . . . are connected to respective drive sources 10, 10' . . . Exhaust tubes 14, 14' are also connected to respective drive sources 10, 10' . . . Also, pairs of cooling water circulation conduits 17 and 18, 17' and 18' . . . are connected to respective drive sources 10, 10' . . . .

The exhaust tubes 14, 14' . . . are connected in parallel.

The cooling water circulation conduits 17 and 18, 17' and 18' . . . are connected in parallel.

Cooling water circulation pumps 19, 19' . . . are directly connected to the cooling water circulation conduit 17 or 18, cooling water circulation conduit 17' or 18' . . . , respectively.

The cogeneration system of the fourth embodiment has the same configuration and functions as those of any one of the first through third embodiments, except that a plurality of drive sources 10, 10' . . . , and a plurality of engines 2, 2' . . . are used. Accordingly, the constituent elements of the fourth embodiment respectively corresponding to those of any one of the first through third embodiments are designated by the same reference numerals, and no detailed description thereof will be given.

Figure 8:
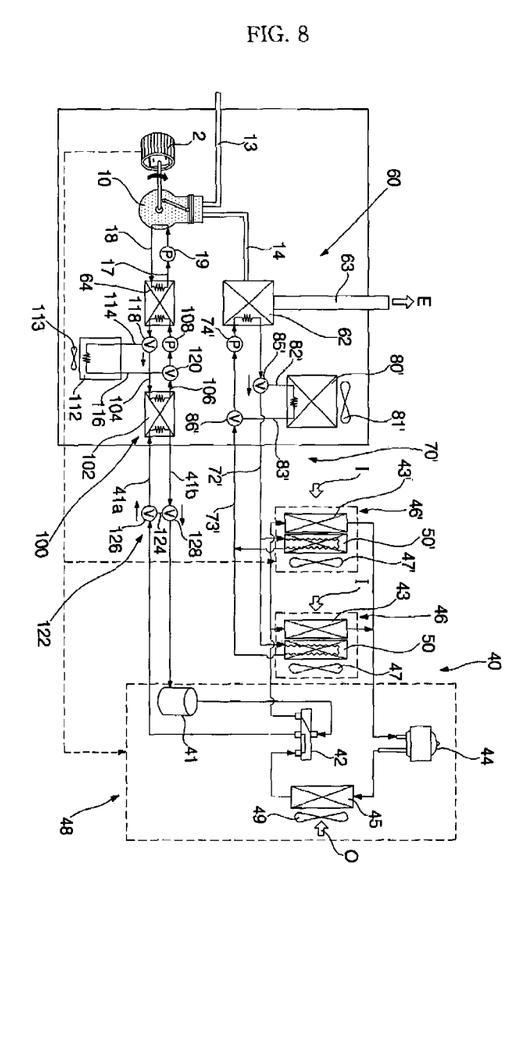
FIG. 8 is a schematic diagram of a cogeneration system according to a fifth embodiment of the present invention, illustrating a state in which the cogeneration system operates in a heating mode.

FIG. 8 is a schematic diagram of a cogeneration system according to a fifth embodiment of the present invention, illustrating a state in which the cogeneration system operates in a heating mode.

As shown in FIG. 8, the heat pump type air conditioner 40 of the cogeneration system according to this embodiment, is of a multi-type. That is, the heat pump type air conditioner 40 includes a plurality of indoor units 46, 46' . . . , and a single outdoor unit 48, to which the indoor units 46, 46' . . . are connected. The indoor units 46, 46' . . . include indoor heat exchangers 43, 43' . . . , which are connected in parallel, respectively.

The indoor units 46, 46' . . . also include indoor fans 47, 47' . . . , respectively.

Heaters 50, 50' . . . are installed in respective indoor units 46, 46' . . . .

The heat medium circulation conduits 72' and 73' are connected to each of the heaters 50, 50' . . . .

The cogeneration system of this embodiment has the same configuration and functions as those of any one of the first through third embodiments, except that the heat pump type air conditioner 40 includes a plurality of indoor units 46, 46' . . . , and a plurality of heaters 50, 50' . . . . Accordingly, the constituent elements of the fifth embodiment respectively corresponding to those of any one of the first through third embodiments are designated by the same reference numerals, and no detailed description thereof will be given.

Figure 9:
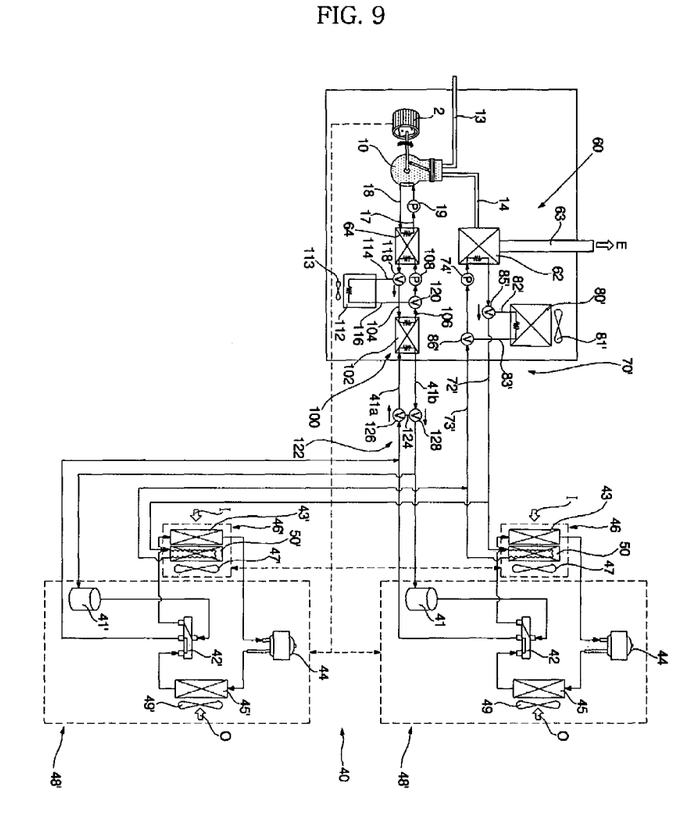
FIG. 9 is a schematic diagram of a cogeneration system according to a sixth embodiment of the present invention, illustrating a state in which the cogeneration system operates in a heating mode.

FIG. 9 is a schematic diagram of a cogeneration system according to a sixth embodiment of the present invention, illustrating a state in which the cogeneration system operates in a heating mode.

As shown in FIG. 9, the heat pump type air conditioner 40 of the cogeneration system according to this embodiment includes a plurality of indoor units 46, 46' . . . , and a plurality of outdoor units 48, 48' . . . .

In the heat pump type air conditioner 40, refrigerant conduits respectively included in the indoor units 46, 46' . . . may be connected in parallel. Refrigerant conduits respectively included in the outdoor units 48, 48' . . . may also be connected in parallel. The following description will be described in conjunction with the case in which each of the outdoor units 48, 48' . . . are connected to an associated one of the indoor units 46, 46' . . . to constitute one air conditioner set, and each air conditioner set operates independently of other air conditioner sets.

The indoor units 46, 46' . . . include respective indoor heat exchangers 43, 43' . . . , respective indoor fans 47, 47' . . . , and respective heaters 50, 50' . . . .

The heat medium circulation conduits 72' and 73' are connected to each of the heaters 50, 50' . . .

The outdoor units 48, 48' . . . include respective compressors 41, 41' . . . , 4-way valves 42, 42' . . . , respective expansion devices 44, 44' . . . , respective outdoor heat exchangers 45, 45' . . . , and respective outdoor fans 49, 49' . . . .

The compressors 41, 41' . . . are connected to the suction-side overheating heat exchanger 102 in parallel via respective refrigerant conduits.

The cogeneration system of this embodiment has the same configuration and functions as those of any one of the first through third embodiments, except that a plurality of indoor units 46, 46' . . . , a plurality of outdoor units 48, 48' . . . , and a plurality of heaters 50, 50' . . . are used. Accordingly, the constituent elements of the sixth embodiment respectively corresponding to those of any one of the first through third embodiments are designated by the same reference numerals, and no detailed description thereof will be given.

The cogeneration system according to any one of the above-described embodiments of the present invention has various effects.

That is, first, the cogeneration system according to the present invention has an advantage in that waste heat of a drive source to drive a generator is re-used to heat air passing through an indoor heat exchanger, so that the heating performance of a heat pump type air conditioner including the indoor heat exchanger is enhanced.

Second, the cogeneration system according to the present invention has an advantage in that the waste heat of cooling water of the drive source is re-used, in addition to the waste heat of exhaust gas of the drive source, to re-heat air passing through the indoor heat exchanger, so that the heating performance of the heat pump type air conditioner is maximized.

Third, the cogeneration system according to the present invention has an advantage in that the waste heat of exhaust gas of the drive source is re-used to re-heat air passing through the indoor heat exchanger, and the waste heat of cooling water of the drive source is re-used to heat refrigerant sucked into a compressor, so that maximal system efficiency is obtained.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A cogeneration system comprising:
    a generator;
    a drive source operating to drive the generator, and thus, to cause the generator to generate electricity, the drive source generating waste heat during the operation of the drive source;
    a heat pump type air conditioner including a compressor, a 4-way valve, an indoor heat exchanger, an expansion device, and an outdoor heat exchanger;
    a heater to heat air, which has passed around the indoor heat exchanger after completing heat exchange with the indoor heat exchanger; and
    a waste heat recoverer to recover the waste heat of the drive source during a heating operation of the heat pump type air conditioner, and to supply the recovered waste heat to the heater.

2. The cogeneration system according to claim 1, wherein the heater is integral with the indoor heat exchanger.

3. The cogeneration system according to claim 1, wherein the heater is separated from the indoor heat exchanger.

4. The cogeneration system according to claim 1, wherein the waste heat recoverer comprises:
    an exhaust gas heat exchanger to absorb heat from exhaust gas discharged from the drive source;
    a cooling water heat exchanger to absorb heat from cooling water used to cool the drive source; and
    a heat transfer unit to transfer heat from at least one of the exhaust gas heat exchanger and cooling water heat exchanger to the heater.

5. The cogeneration system according to claim 4, wherein the heat transfer unit further comprises:
    a heat medium circulation conduit to guide a heat medium for circulation of the heat medium such that the heat medium passes through the exhaust gas heat exchanger while being heated by the exhaust gas heat exchanger, is fed to the heater to transfer heat to the heater, and is then returned to the exhaust gas heat exchanger; and
    a heat medium circulation pump to pump the heat medium for the circulation of the heat medium.

6. The cogeneration system according to claim 5, wherein the heat transfer unit further comprises:
    a cooling heat exchanger to cool the heat medium heated by the exhaust gas heat exchanger during a cooling operation of the heat pump type air conditioner; and a cooling heat exchanger circulation conduit connected to the heat medium circulation conduit to guide the heat medium to be circulated through the exhaust gas heat exchanger and the cooling heat exchanger.

7. The cogeneration system according to claim 5, wherein the heat transfer unit further comprises:
a valve unit to control the heat medium circulation conduit and the cooling heat exchanger circulation conduit such that the heat medium is circulated through the exhaust gas heat exchanger and the heater during the heating operation of the heat pump type air conditioner, and is circulated through the exhaust gas heat exchanger and the cooling heat exchanger during a cooling operation of the heat pump type air conditioner.

8. The cogeneration system according to claim 4, further comprising:
a suction-side overheating heat exchanger to heat a refrigerant sucked into the compressor during the heating operation of the heat pump type air conditioner;
a second heat medium circulation conduit to guide a second heat medium for circulation of the second heat medium such that the second heat medium passes through the cooling water heat exchanger while being heated by the cooling water heat exchanger, is fed to the suction-side overheating heat exchanger to transfer heat to the suction-side overheating heat exchanger, and is then returned to the cooling water heat exchanger; and
a second heat medium circulation pump to pump the second heat medium for the circulation of the second heat medium.

9. The cogeneration system according to claim 8, further comprising:
a second cooling heat exchanger to cool the second heat medium heated by the cooling water heat exchanger during a cooling operation of the heat pump type air conditioner; and
a second cooling heat exchanger circulation conduit connected to the second heat medium circulation conduit to guide the second heat medium to be circulated through the cooling water heat exchanger and the second cooling heat exchanger.

10. The cogeneration system according to claim 9, further comprising:
a second valve unit to control the second heat medium circulation conduit and the second cooling heat exchanger circulation conduit such that the second heat medium is circulated through the cooling water heat exchanger and the suction-side overheating heat exchanger during the heating operation of the heat pump type air conditioner, and is circulated through the cooling water heat exchanger and the second cooling heat exchanger during the cooling operation of the heat pump type air conditioner.

11. The cogeneration system according to claim 10, further comprising:
a refrigerant controller which controls the refrigerant supplied toward the compressor to be sucked into the compressor after passing through the suction-side overheating heat exchanger during the heating operation of the heat pump type air conditioner, and to be sucked into the compressor without passing through the suction-side overheating heat exchanger during the cooling operation of the heat pump type air conditioner.

12. The cogeneration system according to claim 11, wherein the refrigerant controller comprises:

a bypass conduit to guide the refrigerant supplied toward the compressor to bypass the suction-side overheating heat exchanger; and
a third valve unit to allow the refrigerant supplied toward the compressor to pass through a selected one of the suction-side overheating heat exchanger and the bypass conduit.

13. The cogeneration system according to claim 1, wherein the drive source is an engine or a fuel cell.

14. The cogeneration system according to claim 1, wherein the heat pump type air conditioner uses the electricity generated from the generator.

15. The cogeneration system according to claim 1, wherein at least one of the drive source, the generator, the heat pump type air conditioner, and the heater comprises a plurality of ones.

16. A cogeneration system comprising:
a generator;
an engine operating to drive the generator, and thus, to cause the generator to generate electricity, the engine generating waste heat during the operation of the engine;
a heat pump type air conditioner including a compressor, a 4-way valve, an indoor heat exchanger, an expansion device, and an outdoor heat exchanger;
a heater to heat air, which has passed around the indoor heat exchanger after completing heat exchange with the indoor heat exchanger;
an exhaust gas heat exchanger to absorb heat from exhaust gas discharged from the engine;
a cooling water heat exchanger to absorb heat from cooling water used to cool the engine;
a heat medium circulation conduit to guide a heat medium for circulation of the heat medium such that the heat medium passes through the exhaust gas heat exchanger while being heated by the exhaust gas heat exchanger, is fed to the heater to transfer heat to the heater, and is then returned to the exhaust gas heat exchanger; and
a heat medium circulation pump to pump the heat medium for the circulation of the heat medium.

17. The cogeneration system according to claim 16, further comprising:
a cooling heat exchanger to cool the heat medium heated by the exhaust gas heat exchanger during a cooling operation of the heat pump type air conditioner;
a cooling heat exchanger circulation conduit connected to the heat medium circulation conduit to guide the heat medium to be circulated through the exhaust gas heat exchanger and the cooling heat exchanger; and
a valve unit to control the heat medium circulation conduit and the cooling heat exchanger circulation conduit such that the heat medium is circulated through the exhaust gas heat exchanger and the heater during the heating operation of the heat pump type air conditioner, and is circulated through the exhaust gas heat exchanger and the cooling heat exchanger during the cooling operation of the heat pump type air conditioner.

18. A cogeneration system comprising:
a generator;
an engine operating to drive the generator, and thus, to cause the generator to generate electricity, the engine generating waste heat during the operation of the engine;
a heat pump type air conditioner including a compressor, a 4-way valve, an indoor heat exchanger, an expansion device, and an outdoor heat exchanger;

a heater to heat air, which has passed around the indoor heat exchanger after completing heat exchange with the indoor heat exchanger;

a suction-side overheating heat exchanger to heat a refrigerant sucked into the compressor;

an exhaust gas heat exchanger to absorb heat from exhaust gas discharged from the engine;

a cooling water heat exchanger to absorb heat from cooling water used to cool the engine; and a heat transfer unit to transfer heat from the exhaust gas heat exchanger to the heater and to transfer heat from the cooling water heat exchanger to the suction-side overheating heat exchanger.

19. The cogeneration system according to claim 18, wherein the heat transfer unit comprises:

a heat medium circulation conduit to guide a heat medium for circulation of the heat medium such that the heat medium passes through the exhaust gas heat exchanger while being heated by the exhaust gas heat exchanger, is fed to the heater to transfer heat to the heater, and is then returned to the exhaust gas heat exchanger;

a heat medium circulation pump to pump the heat medium for the circulation of the heat medium;

a second heat medium circulation conduit to guide a second heat medium for circulation of the second heat medium such that the second heat medium passes through the cooling water heat exchanger while being heated by the cooling water heat exchanger, is fed to the suction-side overheating heat exchanger to transfer heat to the suction-side overheating heat exchanger, and is then returned to the cooling water heat exchanger; and a second heat medium circulation pump to pump the second heat medium for the circulation of the second heat medium.

20. The cogeneration system according to claim 19, wherein the heat transfer unit further comprises:

a cooling heat exchanger to cool the heat medium heated by the exhaust gas heat exchanger during a cooling operation of the heat pump type air conditioner; and a cooling heat exchanger circulation conduit connected to the heat medium circulation conduit to guide the heat medium to be circulated through the exhaust gas heat exchanger and the cooling heat exchanger;

a second cooling heat exchanger to cool the second heat medium heated by the cooling water heat exchanger during the cooling operation of the heat pump type air conditioner; and a second cooling heat exchanger circulation conduit connected to the second heat medium circulation conduit to guide the second heat medium to be circulated through the cooling water heat exchanger and the second cooling heat exchanger.

* * * * *